April 16, 1940.                E. P. ROSS                 2,197,386
MOTION REPRODUCING UNIT
Filed Jan. 5, 1939
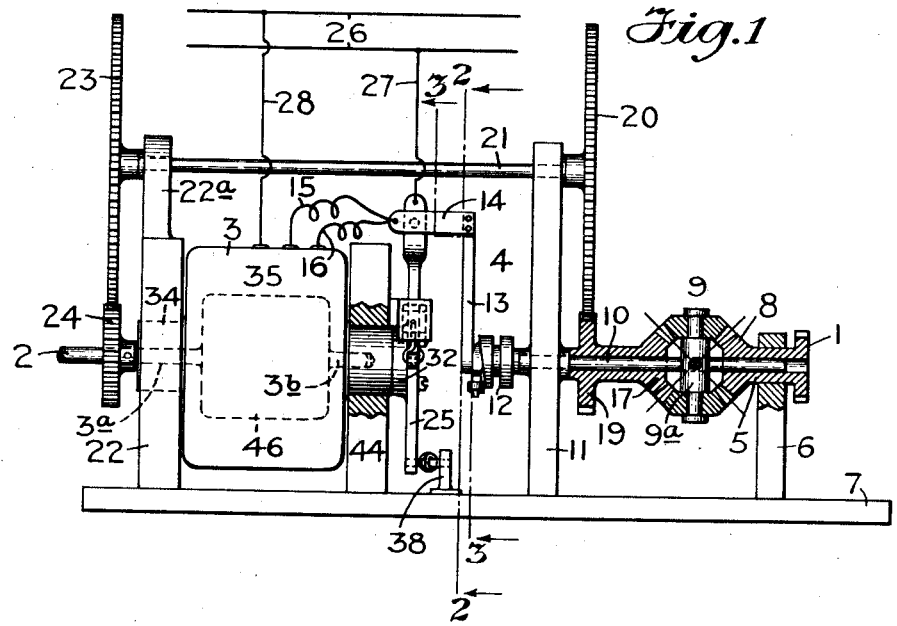
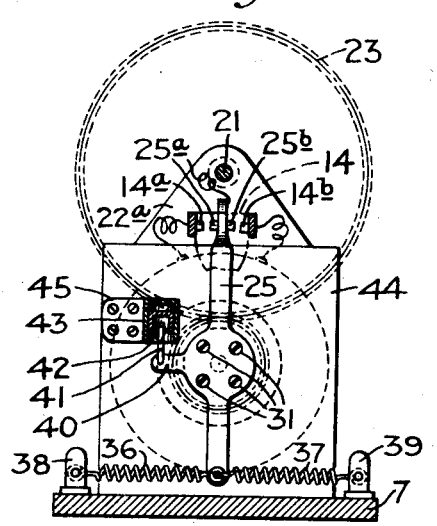
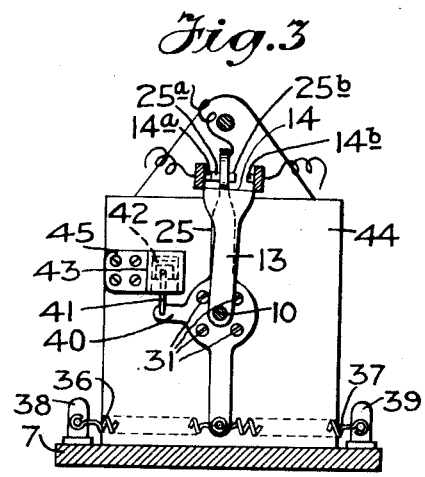
INVENTOR
*Elliott P. Ross*
BY
ATTORNEY Patented Apr. 16, 1940

2,197,386

UNITED STATES PATENT OFFICE 2,197,386

MOTION REPRODUCING UNIT

Elliott P. Ross, Forest Hills, N. Y., assignor to Ford Instrument Company, Inc., Long Island City, N. Y., a corporation of New York Application January 5, 1939, Serial No. 249,416

7 Claims. (Cl. 172—239)

The invention herein disclosed relates generally to motion reproducing units in which the movement of one object, a motion receiving member, is reproduced in a driven member the latter being driven by a power or servo-motor. More particularly the invention relates to the manner of control of follow-up mechanisms in units of this type.

In these motion reproducing units, in accomplishing synchronous or positional agreement between the motion receiving and driven members, various mechanisms and auxiliaries of a more or less complicated construction have been used to control the action of the follow-up mechanisms. In certain units of this type the power or servo-motors are controlled by relatively movable cooperating control elements actuated by the combined action of the motion receiving and driven members. Devices for accomplishing the same general object have been produced previously, such as, for example, that disclosed by United States Patent No. 1,784,504 to Harry L. Tanner, dated December 9, 1930.

The principal object of this invention is to provide a follow-up mechanism in a unit of this type which is smooth acting, reliable, of simplified construction, effective and efficient for readily following and transmitting variable speed motion, and for amplifying the power input thereof to any desired degree.

Another object of this invention is to provide a follow-up mechanism or servo-motor having relatively movable cooperating control elements, one of the elements having a vibrating or oscillatory motion imparted to it other than the relative movement between these elements, which vibratory motion effects the variable intermittent energization of the servo-motor with extreme rapidity.

These and other objects are accomplished in accordance with this invention by using a power or servo-motor having a rotatably mounted stator and rotor. The rotor drives the driven member in the usual manner in accordance with the movement of the motion receiving member. The movement of the rotor is controlled by two relatively movable cooperating control elements each having control contacts. One of these elements is controlled in accordance with the relative movement between the motion receiving and driven members, and the other element is mounted on the stator of the servo-motor and moves therewith in accordance with the torque reaction effect of the rotor on the stator. This movement of the stator is limited by the action of resilient means which normally maintains the contacts of this element in a relatively central position with relation to those of the other element. A vibratory or oscillatory motion of this element other than that due to the relative movement between the motion receiving and driven members takes place. This vibratory motion of this control element rapidly and intermittently effects the variable energization of the servo-motor so that the driven member follows the motion receiving member in a smooth acting and efficient manner. The vibrating element controls the servo-motor by rapidly varying the energization thereof proportionally to the movements of the motion receiving member. Since the elements controlling both forward and reverse directions of movement of the driven member are subject to rapid oscillations due to the vibratory make and break action of the control contacts, but for varying lengths of time, depending upon the direction of movement of the motion receiving member, the driven member is susceptible to instantaneous and minutely variable movement, so that a smooth positive following motion of the driven member results.

A unit embodying the invention is illustrated in the accompanying drawing in which:

Fig. 1 is a side elevation of the unit partly in section;

Fig. 2 is a sectional end elevation taken along the line 2—2 of Fig. 1; and

Fig. 3 is another sectional end elevation taken along the line 3—3 of Fig. 1 and shows the electrical contact elements and illustrates the relation of the contacts under one condition of the operation of the unit.

The motion reproducing unit illustrated in Fig. 1 consists essentially of a motion receiving member, which is shown as a spur gear 1 that may be connected to any member, the motion of which it is desired to reproduce; a driven member, which is represented in the drawing as a shaft 2 that may be connected to any object to drive; a reversible electric motor 3 for driving the driven member; and control means for the electric motor designated generally by the numeral 4.

The motion receiving member or gear 1 is formed on the end of a hub 5 that is journaled in a bearing bracket 6 which extends laterally from a base 7 on which all of the mechanism of the unit is mounted. On the other end of the hub 5, there is formed a bevel gear 8 that forms one side of a differential 9. The center or spider 9a of the differential 9 is mounted upon and secured to a shaft 10 that is journaled in the hub 5 and a bearing bracket 11 mounted on the base and through which the shaft extends. The shaft 10 actuates through a yieldable cam drive 12 an electrical contact arm or control element 13 having a bifurcated, laterally extending end section 14 made of electrical insulating material, each arm of which carries an electrical contact, 14a and 14b, insulated from each other and connected by lead wires 15 and 16 to the motor 3.

The contact arm or control element 13 is moved in accordance with the relative movement between the motion receiving and driven members by connecting the driven member to the other side of the differential to which the motion receiving member 1 is connected. This connection is effected through a bevel gear 17 that is formed on one end of a hub 18 and which constitutes one side of the differential 9. The other end of the hub 18 carries a spur gear 19 formed thereon, and the hub 18 is journaled on the shaft 10. The spur gear 19 meshes with a gear 20 secured upon one end of a shaft 21 journaled in the bearing bracket 11. The other end of the shaft 21 is journaled in a bearing bracket 22a extending from a bracket 22 and carries a gear 23 which meshes with a spur gear 24 on a shaft 3a of the motor 3, and drives the driven member which is represented by the shaft 2. Thus the movements of the shaft 10 and the contact arm or control element 13 are in accordance with the differences in movement between the motion receiving and driven members.

The contacts 14a and 14b of the control element 13 cooperate with contacts 25a and 25b mounted on another contact arm or control element 25. The contacts 25a and 25b are positioned between the contacts 14a and 14b so that when the contact arm 13 moves clockwise, as seen in Fig. 3, the contact 14a engages the contact 25a, and when the contact arm 13 moves counter-clockwise, the contact 14b engages the contact 25b. The contacts 14a, 14b and 25b are connected respectively to the motor 3 and to one side of electrical supply lines 26 by means of flexible leads 15, 16, 27 and the other side of the line is connected to the motor 3 by means of a wire 28. When the contact 14a engages the contact 25a the motor operates in one direction and in the opposite direction when the contact 25b is engaged by the contact 14b. The direction of movement of the arm or control element 13 therefore determines the direction of the operation of the motor.

To prevent oscillation or hunting of the motor and to maintain positional agreement between the motion receiving and driven members, the relation of the contacts controlling the motor is affected in accordance with the relative movement between the motion receiving and driven members and the operation of the motor. This is accomplished through the contact arm 25, which in the unit disclosed, is displaced from its neutral position in accordance with the torque reaction of the motor, and its relation to the inertia of the stator of the motor.

As more clearly shown in Fig. 2, the contact arm 25 is secured by screws 31 to an extension 32 of one of two hubs 33 and 34 of the stator 35 of the motor 3. The arm 25 is normally maintained in a neutral or vertical position by centering springs 36 and 37 which extend between the arm and the standards 38 and 39 mounted on the base 7. Thus contacts 25a and 25b are maintained in a cooperative, relatively central position, with that of the contacts 14a and 14b. For the purpose of damping the action of the springs 36 and 37, the arm 25 includes a crank arm 40 extending at right angles thereto and to which is pivotally secured one end of a piston rod 41, the other end of which is secured to a piston 42 of a dash-pot 43. The dash-pot 43 is mounted upon the bearing bracket 44 and secured thereto by means of an angle bracket 45.

The stator 35 of the motor 3 is rotatably mounted for limited movement on the hubs 33 and 34 journaled in bearing brackets 44 and 22 mounted on the base 7. The rotor 46 is also rotatably mounted on shafts 3a and 3b journaled in the hubs 33 and 34, and drives the driven member 2 and the gear 24 connected therewith through the shaft 3a.

In operation of the unit, the motion receiving member, or the gear 1, is rotated, in accordance with the movement which it is desired to reproduce in the driven member or the shaft 2. When the system is at rest, the electrical contacts are in the position as illustrated in Fig. 2. These contacts are so connected and arranged with relation to the supply lines and the motor, that the rotor turns in a direction opposite to that of the movement of the motion receiving member. Upon movement of the motion receiving member 1, the control element 13 is moved until the contacts 25a or 25b engage either contact 14a or 14b respectively, depending upon the direction in which the member is rotated.

Assuming that the motion receiving member is turned in a clockwise direction when the system is viewed as illustrated in Fig. 2; the control element 13 will be rotated in the same direction until the contact 14a engages contact 25a and effects energization of the motor 3. The contacts now assume the position as shown in Fig. 3. The rotor 46 therefore rotates in an anti-clockwise direction and drives the driven member in the same direction. The torque of the rotor reacting on the stator 35 effects an opposite movement thereon which is opposed by the action of the spring 37 and the inertia of the stator. The control element 25 is therefore displaced in the same direction (clockwise) as the control element 13 an amount proportional to the torque applied to the rotor, thus separating the contacts 14a and 25a, and deenergizing the motor 3. This relative movement of the control elements sets up a vibratory or oscillatory movement of the stator 35, which is opposed by the action of the springs 36 and 37 and damped by the dash-pot 43. This vibratory motion of the control element 25 rapidly and intermittently effects the variable energization of the servo-motor so that the driven member 2 follows the motion receiving member 1 in a smooth acting and efficient manner. The movement of the driven member 2 is communicated, as described above, by the follow-up mechanism of the unit, through the back gearing, differential, and yieldable cam coupling, to move the control element 13 in an opposite direction bringing the contacts back to their original normal position as shown in Fig. 2. The control element 25 is therefore affected in accordance with the torque reaction effect of the rotor on the stator and the element 13 is affected in accordance with the relative movement between the motion receiving and driven members. The operation of the unit in the opposite direction is the same as described above.

From the foregoing description it will be apparent that there is produced in this unit a simplified construction in which, due to the relation between the control elements, the driven member is susceptible to instantaneous and variable movement to accurately follow the movement of the motion receiving member. It will also be seen that the utilization of the torque reaction of the servo-motor, in the arrangement disclosed, smooths out the action of the follow-up mechanism, in the attainment of positional agreement between the motion receiving and driven members. The arrangement also acts as a filter, to smooth out rapid changes in velocity.

It is obvious that various changes may be made by those skilled in the art in the details of the embodiment of the invention illustrated in the accompanying drawing and described above within the principle and scope of the invention as expressed in the appended claims.

I claim:

1. In a unit of the type described a movably mounted motion receiving member, a movably mounted driven member, a power motor for driving the driven member, and control means for the power motor, including two relatively movable cooperating control elements, means for effecting relative movement of the said control elements upon relative movement between the motion receiving and driven members and means for affecting one of said control elements in fixed proportion to the torque of the power motor.

2. In a unit of the type described a movably mounted motion receiving member, a movably mounted driven member, a power motor having a rotatably mounted stator and a rotor for driving the driven member and control means for the power motor, including two relatively movable cooperating control elements, means for effecting relative movement of the said control elements upon relative movement between the motion receiving and driven members and means for affecting one of said control elements upon movement of the stator in fixed proportion to the torque reaction between the rotor and the stator.

3. In a unit of the type described a movably mounted motion receiving member, a movably mounted driven member, a power motor having a rotatably mounted stator and a rotor for driving the driven member, control means for the power motor, including two relatively movable cooperating control elements, means for effecting relative movement of the said control elements upon relative movement between the motion receiving and driven members and means for affecting one of said control elements upon movement of the stator in response to the torque reaction of the rotor, said torque responsive means including a device for limiting the movement of said control element in fixed proportion of the torque.

4. In a unit of the type described a movably mounted motion receiving member, a movably mounted driven member, a power motor having a rotatably mounted stator and a rotor for driving the driven member, and control means for the power motor, including two relatively movable cooperating control elements, means for effecting relative movement of the said control elements upon relative movement between the motion receiving and driven members and means for affecting one of said control elements upon movement of the stator in response to the torque reaction of the rotor, said torque responsive means including a device for restoring said control element to its normal position, and means for damping said position restoring means.

5. In a unit of the type described a movably mounted motion receiving member, a movably mounted driven member, a power motor having a rotatably mounted stator and a rotor, means for limiting the movement of the stator proportional to the torque applied to the rotor, and control means for the power motor, including two relatively movable cooperating control elements, means for effecting relative movement of the said control elements upon relative movement between the motion receiving and driven members and means for affecting one of said control elements upon movement of the said stator.

6. In a unit of the type described a movably mounted motion receiving member, a movably mounted driven member, a power motor for driving the driven member, and control means for the power motor, including two relatively movable cooperating control elements, means for effecting relative movement of the said control elements upon relative movement between the motion receiving and driven members, means associated with said motor responsive to the torque reaction between the stator and the rotor of said motor, and means for displacing one of said control elements in proportion to said torque.

7. In a unit of the type described a movably mounted motion receiving member, a movably mounted driven member, a power motor for driving the driven member, and control means for the power motor, including two relatively movable cooperating control elements, means for effecting relative movement of the said control elements upon relative movement between the motion receiving and driven members, means associated with said motor and movable in fixed proportion to the torque reaction between the stator and rotor of said motor for measuring the torque thereof and means associated with the last mentioned means for displacing one of said control elements in accordance with the movement of said torque measuring means.

ELLIOTT P. ROSS.